(12) United States Patent
Yoon et al.

(10) Patent No.: US 9,483,936 B2
(45) Date of Patent: Nov. 1, 2016

(54) REMOTE CONTROLLER AND CONTROL METHOD THEREOF, DISPLAY DEVICE AND CONTROL METHOD THEREOF, DISPLAY SYSTEM AND CONTROL METHOD THEREOF

(75) Inventors: Yeo-ri Yoon, Suwon-si (KR); Yong-hwan Kwon, Seongnam-si (KR); Joo-youn Kim, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1068 days.

(21) Appl. No.: 12/905,668

(22) Filed: Oct. 15, 2010

(65) Prior Publication Data
US 2011/0221665 A1 Sep. 15, 2011

(30) Foreign Application Priority Data
Mar. 15, 2010 (KR) .......................... 10-2010-0023023

(51) Int. Cl.
G06F 3/048 (2013.01)
G08C 23/04 (2006.01)
G08C 17/02 (2006.01)
H04N 21/41 (2011.01)

(52) U.S. Cl.
CPC .............. *G08C 23/04* (2013.01); *G08C 17/02* (2013.01); *H04N 21/4126* (2013.01); *G08C 2201/30* (2013.01)

(58) Field of Classification Search
CPC ................. G06F 3/04842; G06F 2203/04803; G06F 3/04812; G06F 3/0482; G06F 9/4443; H04N 1/00408; H04N 21/42224; H04N 21/485; H04N 5/44591
See application file for complete search history.

(56) References Cited

U.S. PATENT DOCUMENTS

| | | | |
|---|---|---|---|
| 5,410,326 A * | 4/1995 | Goldstein | 348/734 |
| 6,791,467 B1 * | 9/2004 | Ben-Ze'ev | 340/12.25 |
| 7,970,438 B2 * | 6/2011 | Yoon et al. | 455/566 |
| 2001/0015719 A1 * | 8/2001 | Van Ee et al. | 345/158 |
| 2001/0028365 A1 * | 10/2001 | Ludolph | 345/764 |
| 2002/0154888 A1 * | 10/2002 | Allen et al. | 386/46 |
| 2005/0052626 A1 * | 3/2005 | Zoidis et al. | 353/100 |

(Continued)

FOREIGN PATENT DOCUMENTS

| | | |
|---|---|---|
| KR | 10-2009-0023943 A | 3/2009 |
| WO | 2010/024357 A1 | 3/2010 |

OTHER PUBLICATIONS

Extended European Search Report issued Feb. 4, 2011 in counterpart European Application No. 10185338.0.

(Continued)

*Primary Examiner* — Jeffrey A Gaffin
*Assistant Examiner* — Ayesha Huertas Torres
(74) *Attorney, Agent, or Firm* — Sughrue Mion, PLLC (57) ABSTRACT

A display system, a display device, and a remote controller for controlling the display device are provided. The remote controller includes: a touch screen which receives an input from a user and display a first manipulation UI group including a shortcut key corresponding to a plurality of buttons to control the display device; a signal output unit which outputs a control signal to the display device based on an input to the touch screen; and a controller which, in response to a user's selection of the shortcut key, displays on the touch screen a second manipulation UI group and parts of the first manipulation UI group, the second manipulation UI group displaying the plurality of buttons.

32 Claims, 9 Drawing Sheets

(56) References Cited

U.S. PATENT DOCUMENTS

| | | | |
|---|---|---|---|
| 2005/0231649 A1* | 10/2005 | Arling | 348/734 |
| 2006/0050142 A1* | 3/2006 | Scott et al. | 348/14.05 |
| 2006/0161865 A1* | 7/2006 | Scott et al. | 715/810 |
| 2007/0229465 A1* | 10/2007 | Sakai et al. | 345/173 |
| 2008/0084389 A1* | 4/2008 | Mac | 345/158 |
| 2008/0318635 A1* | 12/2008 | Yoon et al. | 455/566 |
| 2009/0058708 A1* | 3/2009 | Park et al. | 341/176 |
| 2009/0239587 A1* | 9/2009 | Negron et al. | 455/566 |
| 2009/0251619 A1* | 10/2009 | Seidel et al. | 348/734 |
| 2010/0023865 A1* | 1/2010 | Fulker et al. | 715/734 |
| 2010/0037180 A1* | 2/2010 | Elias et al. | 715/840 |
| 2010/0085310 A1* | 4/2010 | Becker | 345/172 |
| 2010/0165217 A1* | 7/2010 | Jacob | 348/734 |
| 2010/0185970 A1* | 7/2010 | Benenson | 715/772 |

OTHER PUBLICATIONS

Communication dated Apr. 11, 2014 issued by the European Patent Office in counterpart European Patent Application No. 10185338.0.

Communication dated Jun. 27, 2016 issued by the Korean Intellectual Property Office in counterpart Korean Patent Application No. 10-2010-0023023.

Communication dated Aug. 4, 2016 issued by the European Patent Office in counterpart European Patent Application No. 10 185 338.0.

* cited by examiner

REMOTE CONTROLLER AND CONTROL METHOD THEREOF, DISPLAY DEVICE AND CONTROL METHOD THEREOF, DISPLAY SYSTEM AND CONTROL METHOD THEREOF

CROSS-REFERENCE TO RELATED APPLICATION

This application claims priority from Korean Patent Application No. 10-2010-0023023, filed on Mar. 15, 2010 in the Korean Intellectual Property Office, the disclosure of which is incorporated herein by reference in its entirety.

BACKGROUND

1. Field

Apparatuses and methods consistent with exemplary embodiments relate to a remote controller and a control method thereof, a display device and a control method thereof, and a display system and a control method thereof, and more particularly, to a remote controller and a control method thereof, a display device and a control method thereof, and a display system and a control method thereof, capable of providing various manipulation user interfaces.

2. Description of the Related Art

A remote controller for controlling a display device such as a television (TV) has a limited space on which a plurality of manipulation buttons (e.g., a power button, numeral buttons, channel changing buttons, sound adjusting buttons, etc.) are mounted. Since the space for mounting the manipulation buttons on the remote controller is limited, it is difficult to mount all manipulation buttons for controlling the display device on the remote controller. Thus, relatively important manipulation buttons are typically mounted thereon according to the related art. With such a restricted configuration of manipulation buttons mounted on the remote controller, it may be difficult for a user to find desired buttons and to use the remote controller because various buttons to be inputted in a specific status are arranged separately from each other.

SUMMARY

Accordingly, one or more exemplary embodiments provide a remote controller and a control method thereof, a display device and a control method thereof, and a display system and a control method thereof, capable of providing a user with a remote controller-controlling environment adequate for each status such that the user can conveniently control a display device.

According to an aspect of an exemplary embodiment, there is provided a remote controller for controlling a display device, the remote controller including: a touch screen which receives an input from a user and which displays a first manipulation user interface (UI) group including a shortcut key corresponding to a plurality of buttons to control the display device; a signal output unit which outputs a control signal to the display device based on an input to the touch screen; and a controller which displays on the touch screen a second manipulation UI group and a part of the first manipulation UI group in response to a user's selection of the shortcut key, the second manipulation UI group displaying the plurality of buttons included in the shortcut key.

The remote controller may include a signal input unit which receives information related to contents displayed on the display device, wherein the controller may display a third manipulation UI group to control the contents displayed on the display device by combining the first and the second manipulation UI groups based on the received information.

The controller may control the part of the first manipulation UI group to be reduced and displayed at a section of the touch screen and the second manipulation UI group to be displayed at another section of the touch screen.

The controller may display the first manipulation UI groups according to a user's selection from among a plurality of first manipulation UI groups.

The plurality of buttons may include buttons that are commonly displayed in a plurality of manipulation UI groups.

When the controller displays the second manipulation UI group on the touch screen, the controller may further display a return button for displaying the shortcut key and stopping the displaying of the second manipulation UI group.

When a button other than the shortcut key included in the first manipulation UI group is selected, the controller may display the part of the first manipulation UI group and the second manipulation UI group.

If the user touches, clicks, or flicks a button or the shortcut key, the controller may execute a corresponding function.

According to an aspect of another exemplary embodiment, there is provided a display device including: a signal processor which processes an image signal; a display unit which displays an image on a screen based on the image signal processed by the signal processor; a communication unit which performs a communication with a remote controller including a touch screen; and a controller which transmits to the remote controller through the communication unit information related to contents displayed on the display unit according to a user's input received from the remote controller.

The display device may include a signal receiving unit which receives the image signal.

The controller may perform the communication by using an infrared (IR) signal or a radio frequency (RF) signal.

According to an aspect of another exemplary embodiment, there is provided a display system including: a remote controller including a touch screen which displays a first manipulation UI group including a shortcut key corresponding to a plurality of buttons, and which displays a part of the first manipulation UI group and a second manipulation UI group in response to a user's selection of the shortcut key, the second manipulation UI group displaying the plurality of buttons corresponding to the shortcut key; and a display device which displays contents corresponding to a user's input received from the remote controller and which transmits to the remote controller information related to the displayed contents.

The remote controller may display a third manipulation UI group to control the contents displayed on the display device by combining the first and the second manipulation UI groups based on the transmitted information.

According to an aspect of another exemplary embodiment, there is provided a method of controlling a remote controller for controlling a display device, the method including: displaying a first manipulation UI group including a shortcut key corresponding to a plurality of buttons on a touch screen; and displaying a part of the first manipulation UI group and a second manipulation UI group on the touch screen in response to a selection of the shortcut key, the second manipulation UI group displaying the plurality of buttons.

The method may further include: receiving from the display device information related to contents displayed on the display device; and displaying a third manipulation UI group to control the contents displayed on the display device by combining the first and the second manipulation UI groups based on the received information.

The displaying the part of the first manipulation UI group and the second manipulation UI group may include reducing and displaying the part of the first manipulation UI group at a section of the touch screen and displaying the second manipulation UI group at another section of the touch screen.

The displaying the first manipulation UI group may include displaying the first manipulation UI group according to a user's selection from among a plurality of first manipulation UI groups.

The displaying the plurality of buttons may include displaying a return button for displaying the buttons as the shortcut key.

The displaying the plurality of buttons may include displaying a part of the first manipulation UI group and the second manipulation UI group regardless of whether the shortcut key is selected in case that a button, other than the shortcut key, included in the first manipulation UI group is selected.

According to an aspect of another exemplary embodiment, there is provided a method for controlling a display device which displays an image by processing an image signal, the method including: receiving a user's input from a remote controller including a touch screen; displaying on a screen contents corresponding to the user's input and transmitting to the remote controller information related to the contents displayed on the screen.

The method may include receiving the image signal.

According to an aspect of another exemplary embodiment, there is provided a method for controlling a display system, the method including: allowing a remote controller having a touch screen displaying a first manipulation UI group including a shortcut key corresponding to a plurality of buttons to display a part of the first manipulation UI group and a second manipulation UI group together on the touch screen, the second manipulation UI group displaying the plurality of buttons; and allowing a display device to display contents corresponding to a user's input received from the remote controller and to transmit to the remote controller information related to the displayed contents.

The transmitting may include allowing the remote controller to display a third manipulation UI group to control the contents displayed on the display device by combining the first and the second manipulation UI groups based on the information related to the contents displayed on the display device.

According to another exemplary embodiment, there is provided a method of controlling a remote controller for controlling a display device, the method including: receiving, by the remote controller, information related to contents displayed on the display device; and displaying, on a touch screen of the remote controller, a manipulation user interface (UI) group corresponding to the contents according to the received information.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Below, exemplary embodiments will be described in detail with reference to accompanying drawings so as to be easily realized by a person having ordinary knowledge in the art. The exemplary embodiments may be embodied in various forms without being limited to the exemplary embodiments set forth herein. Descriptions of well-known parts are omitted for clarity, and like reference numerals refer to like elements throughout. Expressions such as "at least one of," when preceding a list of elements, modify the entire list of elements and do not modify the individual elements of the list.

Figure 1:
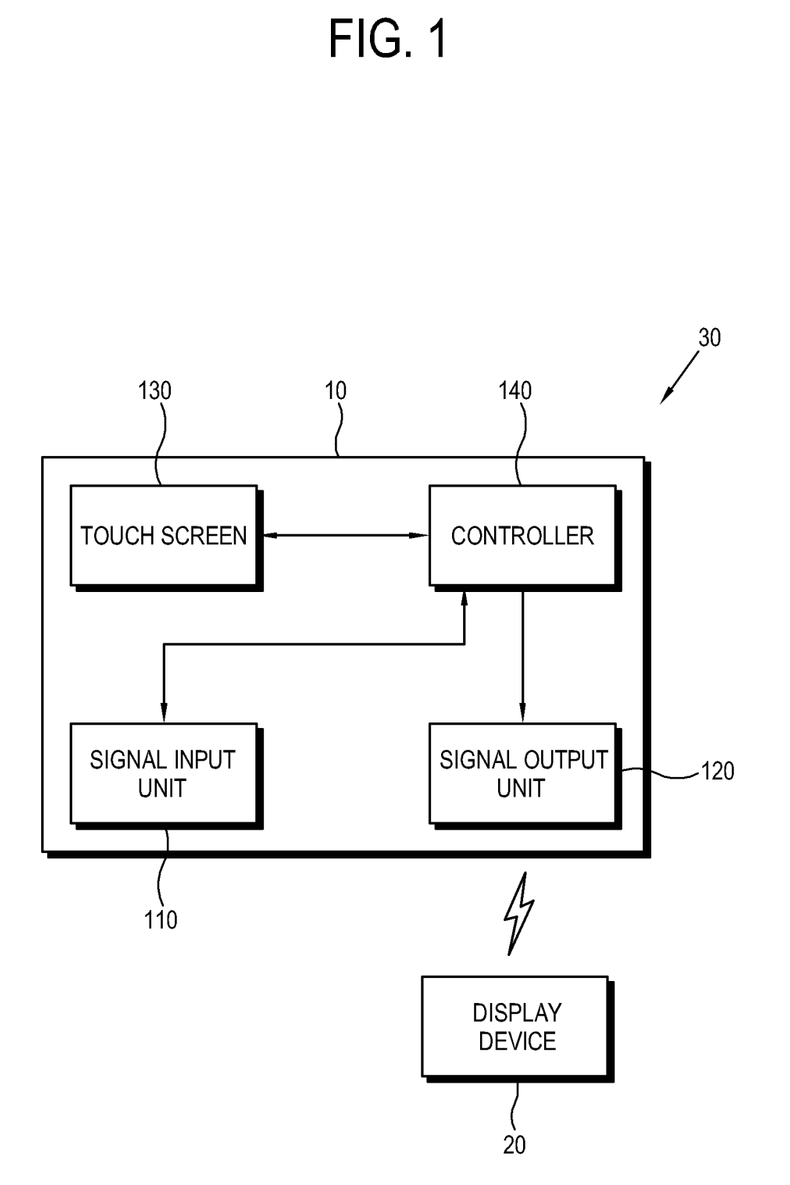
FIG. 1 shows a remote controller included in a display system in accordance with an exemplary embodiment.

FIG. 1 shows a remote controller included in a display system 30 in accordance with an exemplary embodiment. As shown in FIG. 1, the display system 30 may include a remote controller 10 and a display device 20. The remote controller 10 may include a signal output unit 120, a touch screen 130 and a controller 140. The remote controller 10 may further include a signal input unit 110.

The touch screen 130 receives an input from a user. For example, when various buttons are displayed on the touch screen 130 and the user manipulates a specific button (e.g., by touching, clicking, or flicking with a finger or with a touch device such as a stylus pen on the specific button), a corresponding function may be executed. The remote controller 10 may display on the touch screen 130 various manipulation user interface (UI) groups including a plurality of buttons to provide a configuration adequate for each status when the user controls the display device 20. Furthermore, one or more of the manipulation UI groups may include a shortcut key for reducing and displaying the buttons.

If the user selects a specific button displayed on the touch screen 130, the signal output unit 120 may transmit to the display device 20 a control signal corresponding to the selected button. The signal output unit 120 may transmit the control signal to the display device 20 according to a wireless communication, such as infrared, radio frequency, Bluetooth, etc.

The controller 140 may control general operations of the remote controller 10, for example, an operation of displaying the manipulation UI groups on the touch screen 130. In particular, if the user selects a shortcut key, the controller 140 may change and display a manipulation UI group displayed on the touch screen 130. Such an operation will be described in detail below.

When the display device 20 receives the control signal transmitted from the signal output unit 120 to display contents corresponding to a user's input and transmits to the remote controller 10 information related to the displayed contents, the signal input unit 110 may receive a corresponding signal and transfer the received signal to the controller 140.

Figure 2A:
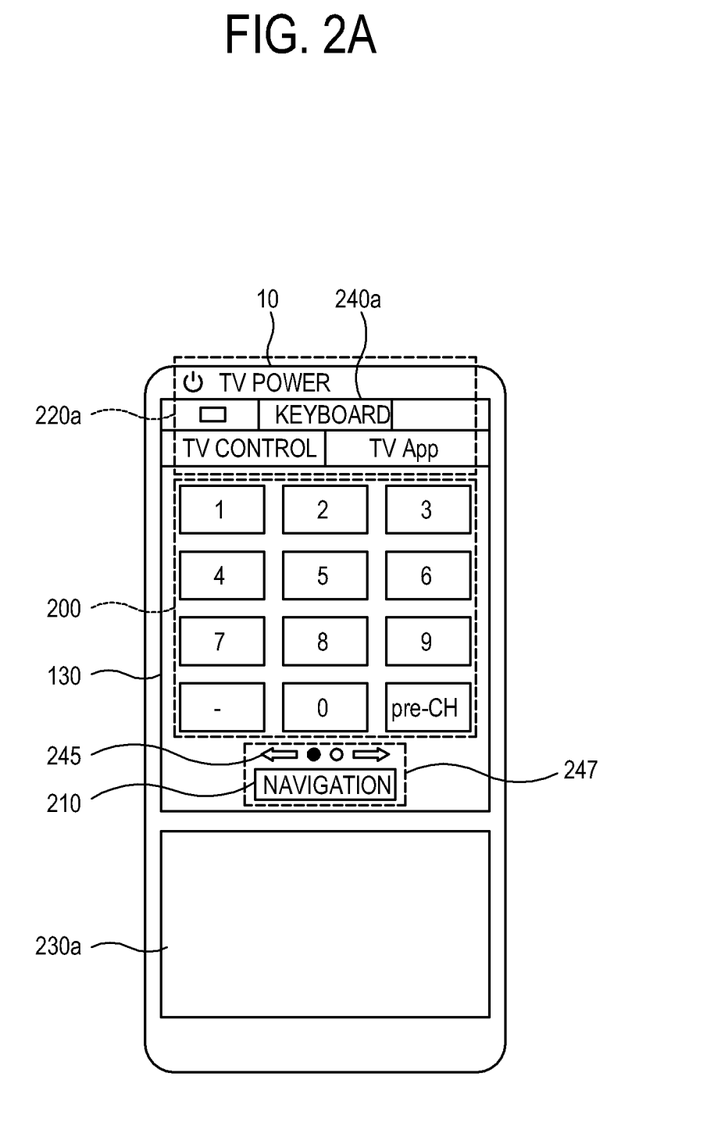
FIG. 2A shows a manipulation UI group displayed on a remote controller in accordance with an exemplary embodiment.

FIG. 2A shows a manipulation UI group displayed on a remote controller 10 in accordance with an exemplary embodiment. In the present exemplary embodiment, a television (TV) is provided as an example of a display device 20, though it is understood that other embodiments are not limited thereto. For example, according to another exemplary embodiment, the display device 20 may be a computer, a monitor, a projector device, a reproducing device, etc.

As shown in FIG. 2A, a touch screen 130 of the remote controller 10 may include: a first section 220a for displaying buttons for TV power, TV control, TV application, and keyboard 240a; a second section 200 for displaying a plurality of numeral buttons; a third section 247 for displaying page-moving keys 245 and a navigation key 210; and a fourth section 230a on which hard keys for adjusting channels and/or volume are disposed.

The contents displayed at each section may change. Accordingly, the remote controller 10 may provide the displayed contents per group. Specifically, the remote controller 10 may provide a first manipulation UI group, a second manipulation UI group, a third manipulation UI group, etc., to respectively display different contents. Here, the manipulation UI groups may respectively correspond to each status that may occur when a user controls the TV 20. The user may select a desired manipulation UI group by using page-moving keys 245. At this time, the manipulation UI group may be changed by using a sliding effect.

It is understood that contents of one or more sections may be fixed. For example, contents displayed on the first section 220a may always be displayed regardless of the manipulation UI group displayed on the touch screen 130. Furthermore, the remote controller 10 of the present exemplary embodiment may display one or more shortcut keys. If a user selects a shortcut key, a plurality of buttons corresponding to the shortcut key may be displayed. For example, in FIG. 2A, the keyboard key 240a and the navigation key 210 correspond to the shortcut keys. That is, if the user selects the keyboard key 240a, character inputting buttons may be displayed.

The shortcut keys may collectively correspond to the buttons commonly used in a plurality of manipulation UI groups, though it is understood that other exemplary embodiments are not limited thereto. Accordingly, in the present exemplary embodiment, the shortcut keys may always be displayed on the touch screen 130 of the remote controller 10 irrespective of a change in the manipulation UI group. Thus, in the present exemplary embodiment, the contents displayed at the second section 200 may be changed when a user changes the manipulation UI group by using the page-moving keys 245.

When a user selects a shortcut key, corresponding buttons may be displayed while the manipulation UI group displayed on the touch screen 130 is changed. If a plurality of buttons displayed as shortcut keys are referred to as a first manipulation UI group, corresponding buttons of a shortcut key may be referred to as a second manipulation UI group. Accordingly, the manipulation UI group shown in FIG. 2A may be referred to as the first manipulation UI group.

Figure 2B:
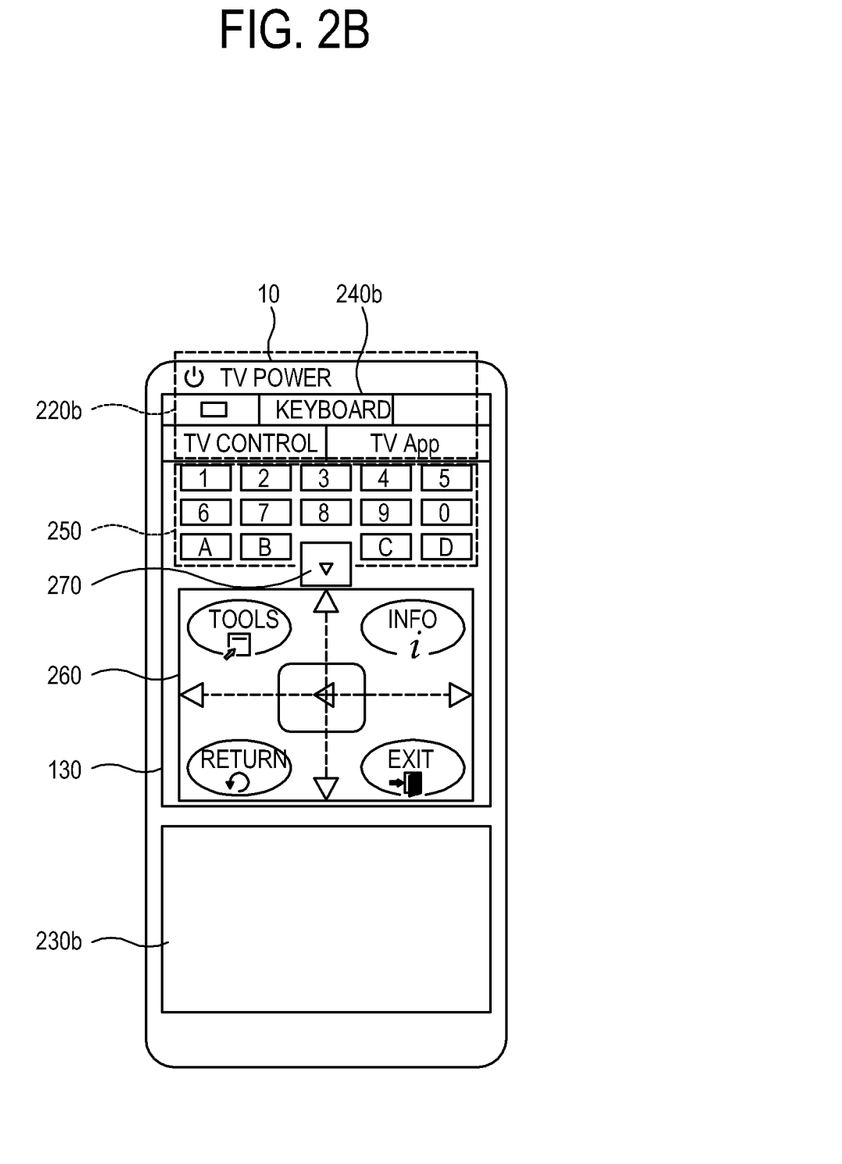
FIG. 2B shows a manipulation UI group displayed when a shortcut key is executed in a remote controller in accordance with an exemplary embodiment.

FIG. 2B shows a manipulation UI group displayed when a shortcut key is executed in the remote controller 10 in accordance with an exemplary embodiment.

If a user selects a shortcut key, the second manipulation UI group and at least some portions of the first manipulation UI group may be displayed on the touch screen 130. For example, if a user selects the navigation key 210, the first section 220b and the fourth section 230b displayed on touch screen 130 may be unchanged, while other sections 250 and 260 may be changed, as illustrated in FIG. 2B.

Specifically, the numeral buttons displayed as the first manipulation UI group may be reduced and displayed at a section 250. Buttons corresponding to the navigation key 210, such as direction-moving buttons, a "TOOLS" button, an "INFO" button, a "RETURN" button, an "EXIT" button and the like, may be displayed at another section 260. At this time, a return button 270 may be displayed so as to display the buttons as shortcut keys. That is, if a user selects the return button 270, the buttons may be displayed as the shortcut keys such that the first manipulation UI group is displayed on the touch screen 130, as illustrated in FIG. 2A. At this time, the manipulation UI groups may be changed with the sliding effect.

Moreover, when the second manipulation UI group is displayed, one or more new buttons may be displayed in a section of the first manipulation UI group that is reduced and displayed. For example, color buttons A, B, C, and D are newly displayed in FIG. 2B.

Meanwhile, when the display device 20 receives a control signal transmitted from the remote controller 10 to display contents corresponding to a user's input and transmits to the remote controller 10 information related to the displayed contents, the controller 140 may display on the touch screen 130 a manipulation UI group for a user to control the display device 20 based on the information related to the displayed contents. For example, the manipulation UI group may be displayed by combining the first and the second manipulation UI groups.

Figure 3A:
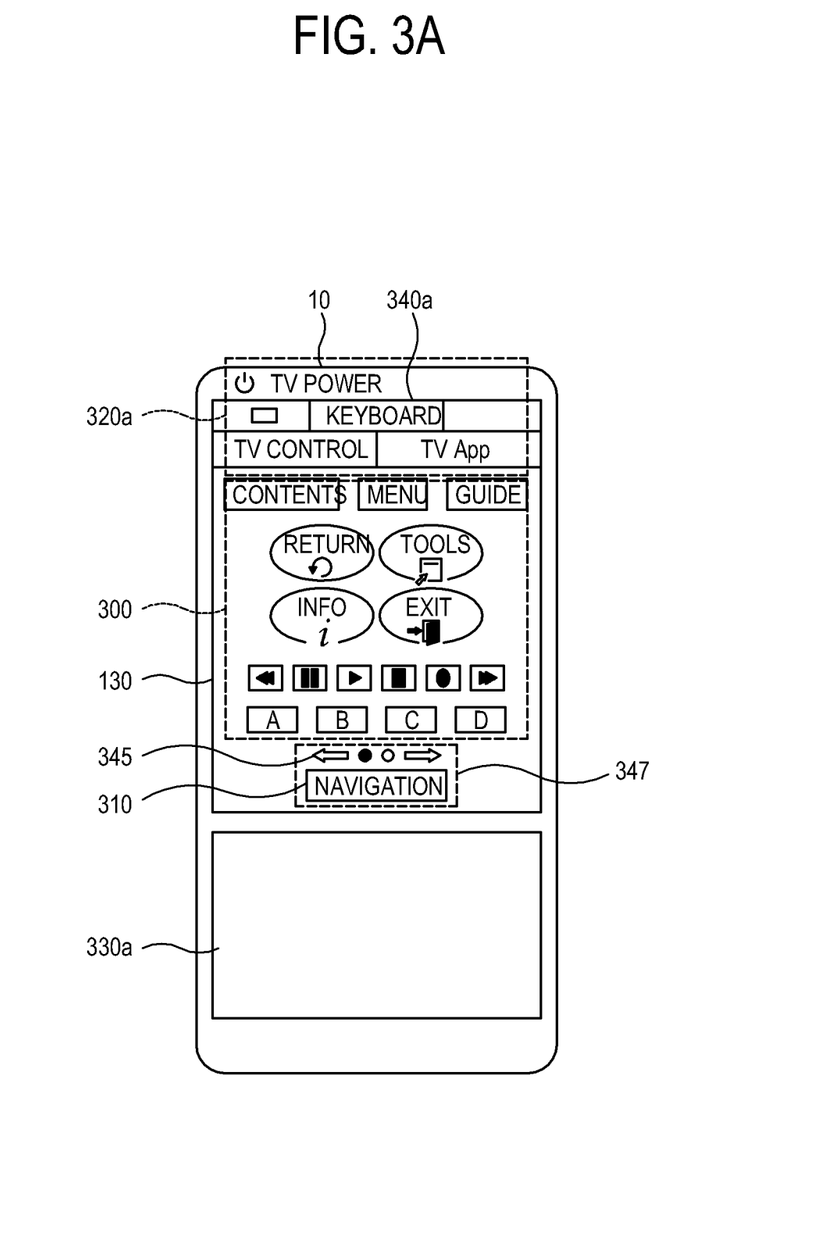
FIG. 3A shows a manipulation UI group displayed on a remote controller in accordance with another exemplary embodiment.

FIG. 3A shows a manipulation UI group displayed on a remote controller 10 in accordance with another exemplary embodiment. As shown in FIG. 3A, color buttons A, B, C, and D, a menu button, a guide button, reproduction buttons, etc., may be displayed at a second section 300 of the touch screen 130 of the remote controller 10 in accordance with the present exemplary embodiment, unlike the manipulation UI group shown in FIG. 2A. As an example, a user may select the manipulation UI group shown in FIG. 2A or a manipulation UI group shown in FIG. 3A by using page-moving keys 345. The contents displayed at a first section 320a and a third section 347 are the same as or similar to the manipulation UI group shown in FIG. 2A, and hard keys mounted at a fourth section 330a are the same as or similar to those shown in FIG. 2A.

Figure 3B:
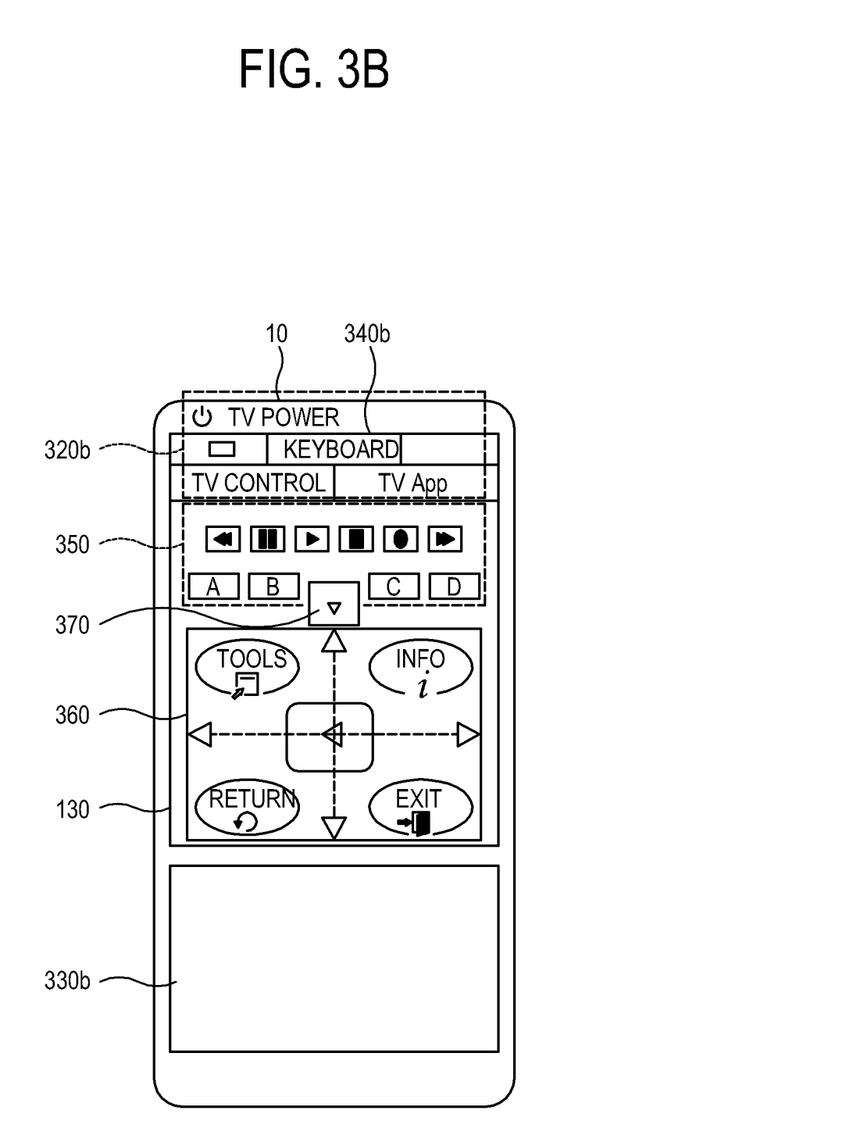
FIG. 3B shows a manipulation UI group displayed when a shortcut key is executed in a remote controller in accordance with another exemplary embodiment.

FIG. 3B shows a second manipulation UI group displayed when a shortcut key is executed in the remote controller 10 in accordance with another exemplary embodiment. As shown in FIG. 3B, if a user selects a navigation button 310 when a first manipulation UI group is displayed (for example, as illustrated in FIG. 3A), the first section 320b and the fourth section 330b may not be changed. However, the other sections 350 and 360 may be changed to display the second manipulation UI group. Specifically, the reproduction buttons and the color buttons displayed as the first manipulation UI group may be reduced and partially displayed at a section 350. Buttons corresponding to the navigation shortcut key 310, such as direction-moving buttons, a "TOOLS" button, an "INFO" button, a "RETURN" button, an "EXIT" button, etc., may be displayed as a second manipulation UI group at another section 360. At this time, a return button 370 may be displayed so as to display the shortcut key.

In the meantime, even though a user selects no shortcut key, the controller 140 may display a plurality of buttons corresponding to a shortcut key in a specific case. For example, if a user selects a menu button or the like, direction-moving buttons may be desired. Accordingly, the controller 140 may display the direction-moving buttons corresponding to a shortcut key even though the shortcut key is not selected.

Figure 4:
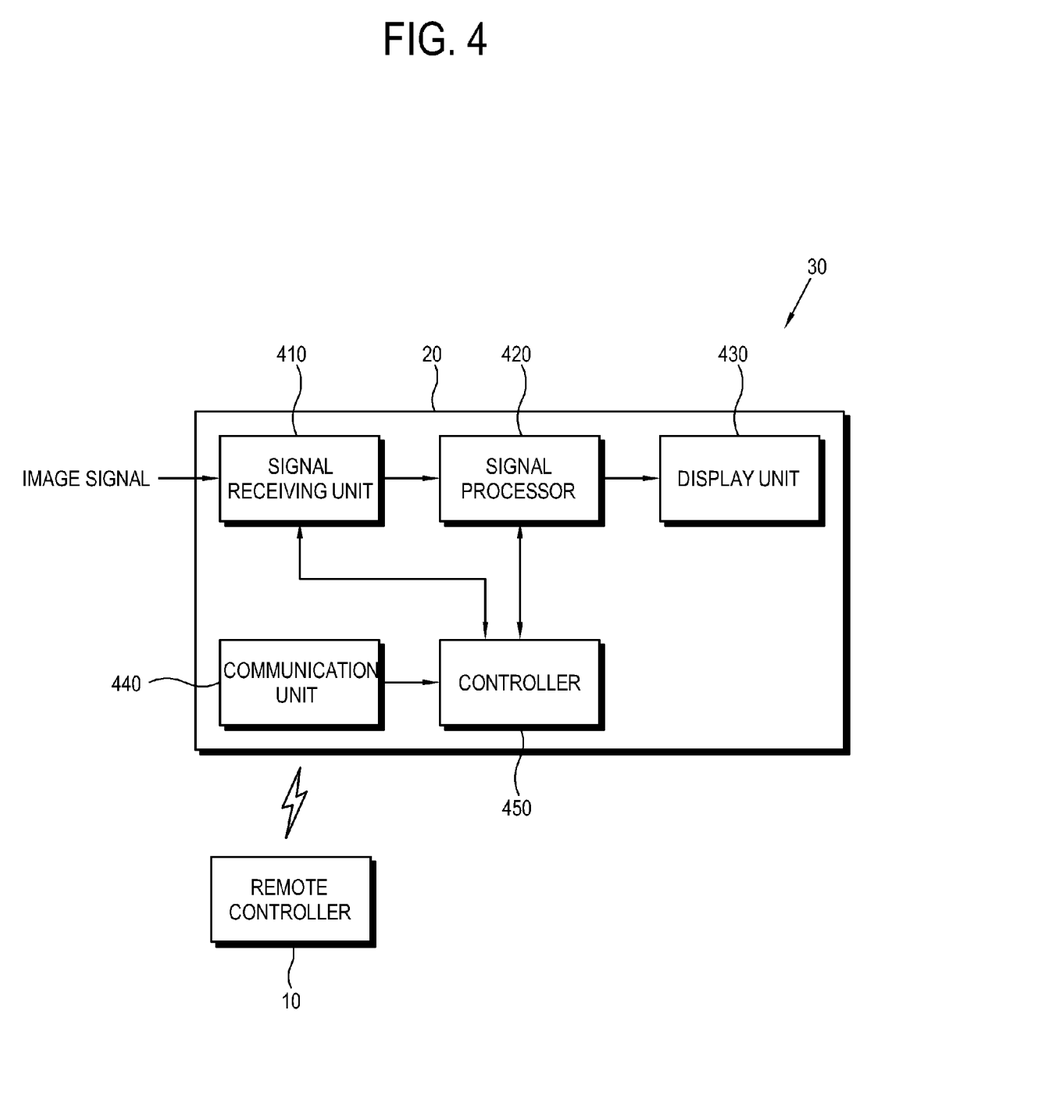
FIG. 4 shows a display device included in a display system in accordance with an exemplary embodiment.

FIG. 4 shows a display device 20 included in a display system 30 in accordance with an exemplary embodiment. As shown in FIG. 4, the display device 20 may include a signal processor 420, a display unit 430, a communication unit 440, and a controller 450. The display device 20 may further include a signal receiving unit 410.

The signal processor 420 may perform a predetermined signal processing so as to display an image on the display unit 430 based on a received image signal. The signal treatment performed by the signal processor 420 may include at least one of decoding, image enhancing, and scaling of the image signal.

The display unit 430 may display the image based on the image signal processed by the signal processor 420. The method by which the display unit 430 displays an image may, for example, be a liquid crystal display (LCD) method. In this case, the display unit 430 may include an LCD panel, a panel driver, a backlight, etc., which are not shown. However, it is understood that other exemplary embodiments are not limited thereto. For example, according to other exemplary embodiments, the display unit 430 may include a light-emitting diode (LED) type display (e.g., an organic LED display), a plasma display, a cathode ray tube display, etc.

The communication unit 440 may receive a remote controller signal corresponding to a user's input, i.e., a control signal of the display device 20. By using a remote controller 10, a user may changes channels, adjust volume, or modify environment settings of the display device 20. The remote controller signal may be any type of wireless communication signal, such as an IR signal and an RF signal.

If a user enters an input by using the remote controller 10, the remote controller 10 may transmit the remote controller signal corresponding to the user's input and the communication unit 440 may transfer the received remote controller signal to the controller 450. Moreover, when the user uses a touch screen 130 of the remote controller 10 and the remote controller 10 outputs information related to a user's position on the touch screen 130, the communication unit 440 may transmit the information to the controller 450.

The controller 450 may generally control other components of the display device 20. For example, the controller 450 may control the display device 20 to be activated according to the remote controller signal transferred from the communication unit 440. Furthermore, when contents corresponding to the user's input are displayed on a screen by performing an operation according to the remote controller signal, the controller 450 may transmit information related to the displayed contents to the remote controller 10 through the communication unit 440.

The signal receiving unit 410 may receive the image signal. The image signal received through the signal receiving unit 410 may be a broadcasting signal such as a digital TV (DTV) signal and a cable broadcasting signal. In this case, the signal receiving unit 410 may be tuned to select a broadcasting signal corresponding to a channel selected by a user under the control of the controller 450.

Moreover, the image signal received through the signal receiving unit 410 may be a signal outputted from an image reproducing device, such as a digital video disc (DVD) and a Blu-ray disc (BD) player. Moreover, the signal receiving unit 410 may receive an audio signal for outputting audio and a data signal for outputting content data, which are not shown. In the meantime, in accordance with the present exemplary embodiment, the image signal, the audio signal, and the data signal may be received together through one signal.

Figure 5:
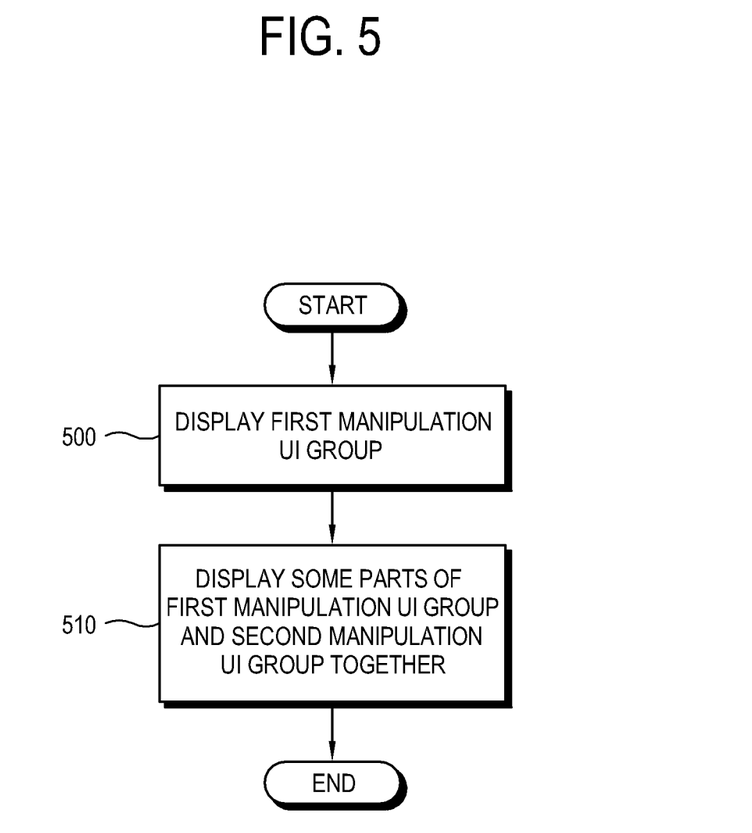
FIG. 5 is a flowchart showing an operation of a remote controller included in a display system in accordance with an exemplary embodiment.

FIG. 5 is a flowchart showing an operation of a remote controller 10 included in a display system 30 in accordance with an exemplary embodiment. As shown in FIG. 5, if the remote controller 10 is turned on, the controller 140 may display a manipulation UI group, i.e., a first manipulation UI group, including at least one shortcut key for reducing a plurality of buttons and partially displaying the buttons on a touch screen 130 (500). As an example, the first manipulation UI group may be changed by using page-moving keys.

If a user selects a shortcut key from among the at least one shortcut key, the controller 140 may display on the touch screen some parts of the first manipulation UI group and a second manipulation UI group for displaying a plurality of buttons corresponding to the shortcut key (510). At this time, some parts of the first manipulation UI group may be displayed at a section of the touch screen 130, and the second manipulation UI group may be displayed at another section thereof.

Figure 6:
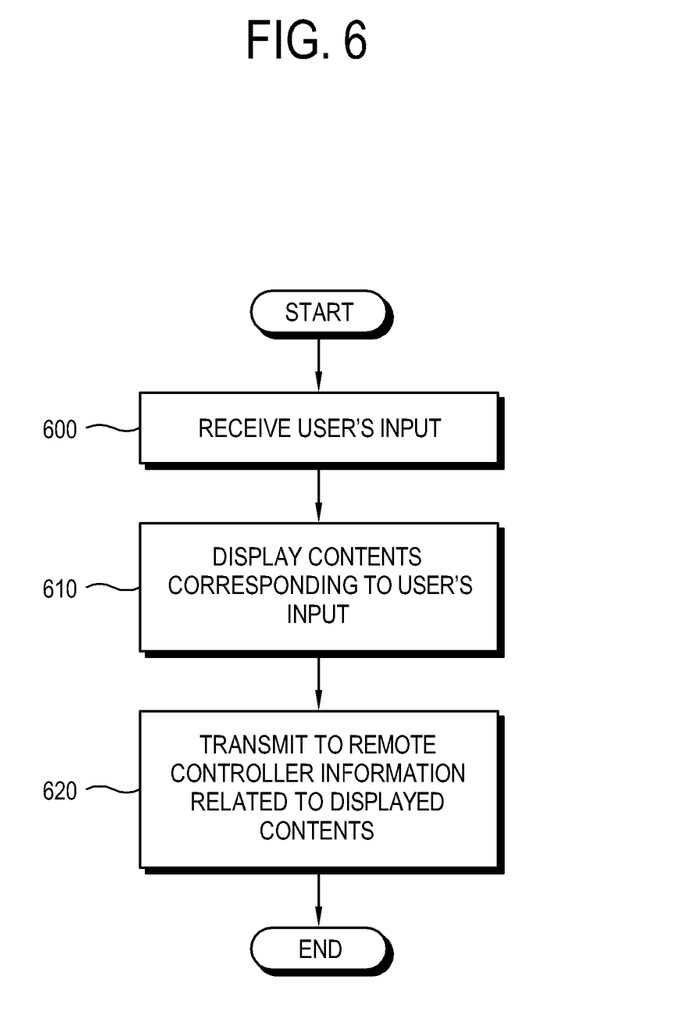
FIG. 6 is a flowchart showing an operation of a display device included in a display system in accordance with an exemplary embodiment.

FIG. 6 is a flowchart showing an operation of a display device 20 included in a display system 30 in accordance with an exemplary embodiment. As shown in FIG. 6, if a communication unit 440 of the display device 20 receives a user's input through a remote controller 10 (600), a controller 450 of the display device 20 may allow contents corresponding to the user's input to be displayed on a screen (610). Furthermore, the controller 450 may control the communication unit 440 to transmit information related to the displayed contents to the remote controller (620).

Figure 7:
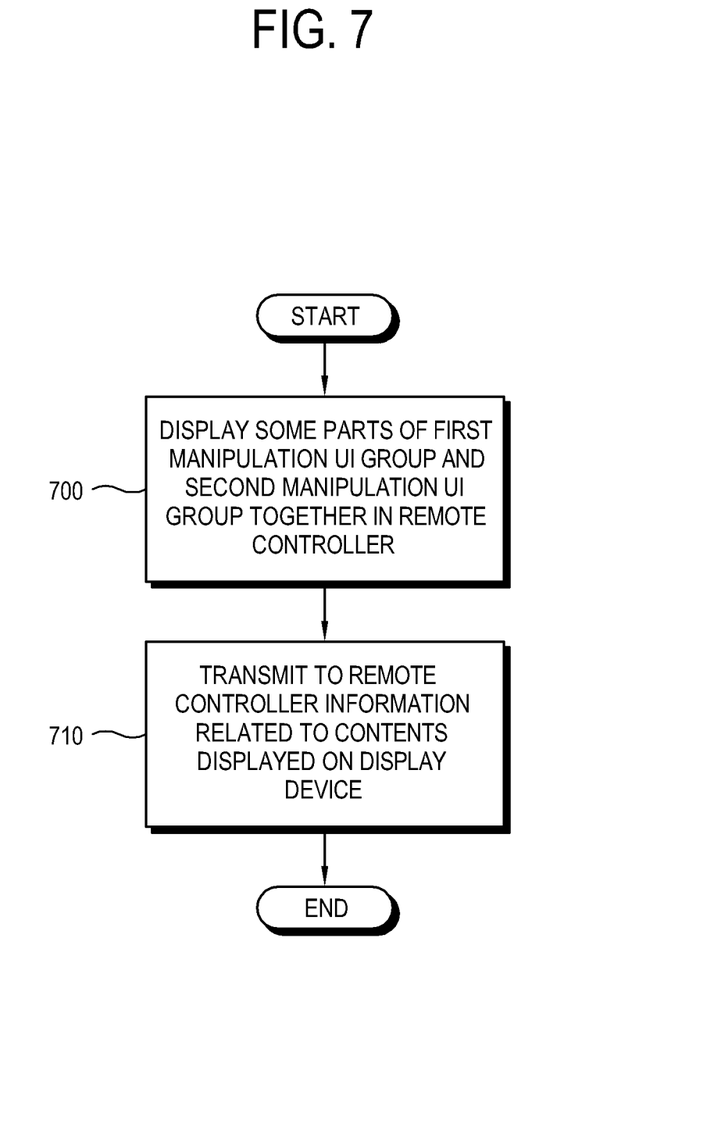
FIG. 7 is a flowchart showing an operation of a display system in accordance with an exemplary embodiment.

FIG. 7 is a flowchart showing an operation of a display system 30 in accordance with an exemplary embodiment. As shown in FIG. 7, a remote controller 10 having a touch screen 130 which displays at least one first manipulation UI group including at least one shortcut key for reducing and partially displaying a plurality of buttons may display a second manipulation UI group and some parts of the first manipulation UI group together, the second manipulation UI group displaying buttons corresponding to a shortcut key to correspond to a user's input (700). If the user's input is input through the remote controller 10, a display device 20 may display contents corresponding to the user's input received from the remote controller 10 and transmit information related to the displayed contents to the remote controller 10 (710).

As described above, in accordance with one or more exemplary embodiments, a remote controller displays a manipulation UI group corresponding to contents displayed on a display device such that a user can conveniently control the display device. Furthermore, when the displayed manipulation UI group is changed, the displayed manipulation UI group is softly changed with a sliding effect or the like, which may be aesthetically pleasing to the user.

While not restricted thereto, exemplary embodiments can also be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, exemplary embodiments may be written as computer programs transmitted over a computer-readable transmission medium, such as a carrier wave, and received and implemented in general-use or special-purpose digital computers that execute the programs. Moreover, while not required in all aspects, one or more units of the remote controller 10 or the display device 20 can include a processor or microprocessor executing a computer program stored in a computer-readable medium.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. A remote controller for controlling a display device, the remote controller comprising:
    a touch screen which receives an input from a user and which displays a first manipulation user interface (UI) group comprising a plurality of first items at a first section of the touch screen and a shortcut key corresponding to a plurality of buttons to control the display device;
    a signal output unit which outputs a control signal to the display device based on the received user's input; and
    a controller which, in response to a user's selection of the shortcut key, simultaneously displays on the touch screen a second manipulation UI group at a second section within the first section and a part of the first manipulation UI group non-overlapping with the second manipulation UI group, the second manipulation UI group being changed from the shortcut key to display the plurality of buttons corresponding to the shortcut key,
    wherein, when the second manipulation UI group and the part of the first manipulation UI group are displayed, the controller controls the plurality of first items of the first manipulation UI group to be rearranged into a plurality of second items of the first manipulation UI group, the plurality of second items being different from the plurality of first items.

2. The remote controller according to claim 1, further comprising:
    a signal input unit which receives information related to contents displayed on the display device,
    wherein the controller displays a third manipulation UI group to control the contents displayed on the display device by combining the first and the second manipulation UI groups based on the received information.

3. The remote controller according to claim 1, wherein the controller displays the first manipulation UI group according to a user's selection from among a plurality of first manipulation UI groups comprising shortcut keys respectively corresponding to groups of buttons.

4. The remote controller according to claim 1, wherein the plurality of buttons corresponding to the shortcut key comprise buttons that are commonly displayed in a plurality of manipulation UI groups.

5. The remote controller according to claim 1, wherein, when the controller displays the second manipulation UI group on the touch screen, the controller further displays a return button for displaying the shortcut key and stopping the displaying of the second manipulation UI group.

6. The remote controller according to claim 1, wherein, when a button, other than the shortcut key, comprised in the first manipulation UI group is selected, the controller simultaneously displays the part of the first manipulation UI group and the second manipulation UI group.

7. The remote controller according to claim 6, wherein, when a button, other than the shortcut key, comprised in the first manipulation UI group is selected, the controller simultaneously reduces the first manipulation UI group and displays the part of the first manipulation UI group and the second manipulation UI group.

8. The remote controller according to claim 6, wherein, when a button, other than the shortcut key, comprised in the first manipulation UI group is selected, the controller simultaneously displays additional buttons within the part of the first manipulation UI group.

9. The remote controller according to claim 1, wherein, if the user touches, clicks, or flicks a button or the shortcut key displayed on the touch screen, the controller executes a corresponding function.

10. The remote controller according to claim 1, further comprising:
    a signal input unit which receives information related to contents displayed on the display device,
    wherein the controller displays a third manipulation UI group according to the received information.

11. The remote controller according to claim 1, wherein the controller displays the second manipulation UI group with a sliding effect.

12. The remote controller according to claim 1, wherein
    each of the plurality of second items are displayed at a smaller size than each of the plurality of first items,
    the second section, within the first section, is smaller than the first section,
    as compared to the plurality of first items, the plurality of second items, at the second section, include newly displayed items,
    a return button is displayed overlapping a part of the second section and a part outside of the second sections, and
    in response to a user's selection of the return button, the touch screen displays the first manipulation UI group at the first section and the shortcut key as displayed before the user's selection of the shortcut key.

13. A display device comprising:
    a signal processor which processes an image signal;
    a display unit which displays an image on a screen based on the image signal processed by the signal processor;
    a communication unit which performs a communication with a remote controller comprising a touch screen; and
    a controller which transmits to the remote controller through the communication unit information related to contents displayed on the display unit according to a user's input received from the remote controller,
    wherein the remote controller displays non-overlapping manipulation user interface (UI) groups on the basis of the received information related to the displayed contents, in response to a user selection of a shortcut key, wherein, when the manipulation UI groups are displayed, in response to the received information related to the displayed contents, a plurality of first items of a first manipulation UI group among the manipulation UI groups is controlled to be rearranged into a plurality of second items of the first manipulation UI group, the plurality of second items being different from the plurality of first items.

14. The display device according to claim 13, further comprising a signal receiving unit which receives the image signal.

15. The display device according to claim 13, wherein the communication unit performs the communication by using an infrared (IR) signal or a radio frequency (RF) signal.

16. A display system comprising:
a remote controller comprising a touch screen which receives a user's input and which displays a first manipulation user interface (UI) group comprising a plurality of first items at a first section of the touch screen and a shortcut key corresponding to a plurality of buttons, wherein the touch screen simultaneously displays a part of the first manipulation UI group and a second manipulation UI group at a second section within the first section, non-overlapping with the first manipulation UI group, in response to a user's selection of the shortcut key, the second manipulation UI group being changed from the shortcut key to display the plurality of buttons corresponding to the shortcut key; and
a display device which displays contents corresponding to the user's input received from the remote controller and transmits to the remote controller information related to the displayed contents,
wherein, when the part of the first manipulation UI group and the second manipulation UI group are displayed, the remote controller rearranges the plurality of first items of the first manipulation UI group into a plurality of second items of the first manipulation UI group, the plurality of second items being different from the plurality of first items.

17. The display system according to claim 16, wherein the touch screen displays a third manipulation UI group to control the contents displayed on the display device by combining the first and the second manipulation UI groups based on the transmitted information.

18. A method of controlling a remote controller for controlling a display device, the method comprising:
displaying, on a touch screen of the remote controller, a first manipulation user interface (UI) group comprising a plurality of first items at a first section of the touch screen and a shortcut key corresponding to a plurality of buttons; and
in response to a user's selection of the shortcut key, simultaneously displaying, on the touch screen, a part of the first manipulation UI group and a second manipulation UI group at a second section within the first section, non-overlapping with the first manipulation UI group, the second manipulation UI group being changed from the shortcut key to display the plurality of buttons corresponding to the shortcut key,
wherein, when the part of the first manipulation UI group and the second manipulation UI group are displayed, the displaying the part of the first manipulation UI group and the second manipulation UI group comprises controlling the plurality of first items of the first manipulation UI group to be rearranged into a plurality of second items of the first manipulation UI group, the plurality of second items being different from the plurality of first items.

19. The method according to claim 18, further comprising:
receiving, from the display device, information related to contents displayed on the display device; and
displaying, on the touch screen, a third manipulation UI group to control the contents displayed on the display device by combining the first and the second manipulation UI groups based on the received information.

20. The method according to claim 18, wherein the displaying the first manipulation UI group comprises displaying the first manipulation UI group according to a user's selection from among a plurality of first manipulation UI groups comprising shortcut keys respectively corresponding to a plurality of buttons.

21. The method according to claim 18, wherein the displaying the part of the first manipulation UI group and the second manipulation UI group comprises displaying a return button for displaying the shortcut key and for stopping the displaying the second manipulation UI group.

22. The method according to claim 18, wherein the displaying the part of the first manipulation UI group and the second manipulation UI group comprises displaying the part of the first manipulation UI group and the second manipulation UI group when a button, other than the shortcut key, comprised in the first manipulation UI group is selected.

23. A non-transitory computer readable recording medium having recorded thereon a program executable by a computer for performing the method of claim 18.

24. A method for controlling a display device which displays an image by processing an image signal, the method comprising:
receiving a user's input from a remote controller comprising a touch screen;
displaying on a screen contents corresponding to the user's input; and
transmitting to the remote controller information related to the contents displayed on the screen,
wherein the remote controller displays non-overlapping manipulation user interface (UI) groups on the basis of the received information related to the displayed contents, in response to a user selection of a shortcut key,
wherein, when the manipulation UI groups are displayed, in response to the received information related to the displayed contents, a plurality of first items of a first manipulation UI group among the manipulation UI groups is controlled to be rearranged into a plurality of second items of the first manipulation UI group, the plurality of second items being different from the plurality of first items.

25. The method according to claim 24, further comprising: receiving the image signal.

26. A non-transitory computer readable recording medium having recorded thereon a program executable by a computer for performing the method of claim 24.

27. A method for controlling a display system, the method comprising:
displaying, on a touch screen of a remote controller, a first manipulation user interface (UI) group comprising a plurality of first items at a first section of the touch screen and a shortcut key corresponding to a plurality of buttons;
in response to a user's selection of the shortcut key, simultaneously displaying, on the touch screen, a part of the first manipulation UI group and a second manipulation UI group at a second section within the fist section, non-overlapping with the first manipulation UI group, the second manipulation UI group being changed from the shortcut key to display the plurality of buttons corresponding to the shortcut key; and displaying, by a display device, contents corresponding to a user's input received from the remote controller and transmitting, to the remote controller, information related to the displayed contents, wherein, when the part of the first manipulation UI group and the second manipulation UI group are displayed, the simultaneously displaying comprises rearranging the plurality of first items of the first manipulation UI group into a plurality of second items of the first manipulation UI group, the plurality of second items being different from the plurality of first items.

28. The method according to claim 27, further comprising displaying, by the remote controller, a third manipulation UI group to control the contents displayed on the display device by combining the first and the second manipulation UI groups based on the transmitted information related to the contents displayed on the display device.

29. A non-transitory computer readable recording medium having recorded thereon a program executable by a computer for performing the method of claim 27.

30. A method of controlling a remote controller for controlling a display device, the method comprising:

receiving, by the remote controller, information related to contents displayed on the display device; and displaying, on a touch screen of the remote controller, a plurality of non-overlapping manipulation user interface (UI) group corresponding to the contents according to the received information, in response to a user selection of a shortcut key, wherein, when the manipulation UI groups are displayed, in response to the received information related to the contents displayed on the display device, the displaying comprises rearranging a plurality of first items of a first manipulation UI group among the manipulation UI groups into a plurality of second items of the first manipulation UI group, the plurality of second items being different from the plurality of first items.

31. The method of claim 30, further comprising:

displaying, on the touch screen, a shortcut key corresponding to a plurality of buttons; and displaying, on the touch screen, another manipulation UI group comprising the plurality of buttons in response to a user's selection of the shortcut key.

32. A non-transitory computer readable recording medium having recorded thereon a program executable by a computer for performing the method of claim 30.

* * * * *